(12) United States Patent
Lewis et al.

(10) Patent No.: US 9,489,137 B2
(45) Date of Patent: Nov. 8, 2016

(54) DYNAMIC STORAGE TIERING BASED ON PERFORMANCE SLAS

(71) Applicant: Formation Data Systems, Inc., Fremont, CA (US)

(72) Inventors: Mark S. Lewis, Pleasanton, CA (US); Vinay P. Rao, San Jose, CA (US); Anna Povzner, San Jose, CA (US)

(73) Assignee: Formation Data Systems, Inc., Fremont, CA (US)

( * ) Notice: Subject to any disclaimer, the term of this patent is extended or adjusted under 35 U.S.C. 154(b) by 6 days.

(21) Appl. No.: 14/614,779

(22) Filed: Feb. 5, 2015

(65) Prior Publication Data

US 2016/0231928 A1    Aug. 11, 2016

(51) Int. Cl.
*G06F 3/06*    (2006.01)

(52) U.S. Cl.
CPC .............. *G06F 3/061* (2013.01); *G06F 3/0619* (2013.01); *G06F 3/0665* (2013.01); *G06F 3/0689* (2013.01)

(58) Field of Classification Search
CPC .... G06F 3/061; G06F 3/0619; G06F 3/0665; G06F 3/0689
USPC .................. 711/114, 154, 156, 159, 160, 221
See application file for complete search history.

(56) References Cited

U.S. PATENT DOCUMENTS

| | | | | |
|---|---|---|---|---|
| 6,269,477 B1 * | 7/2001 | Fitzgerald | ............. | G06F 8/4442 717/131 |
| 7,657,508 B2 * | 2/2010 | Morris | ............... | G06F 17/30289 707/999.002 |
| 8,286,015 B2 * | 10/2012 | Olarig | ................... | G06F 1/3221 711/112 |
| 8,527,467 B2 * | 9/2013 | Shmueli | ............ | G06F 17/30153 707/651 |
| 8,745,327 B1 * | 6/2014 | Throop | ................. | G06F 3/0647 711/100 |
| 9,054,992 B2 * | 6/2015 | Wright | .................... | H04L 41/50 |
| 9,092,461 B1 * | 7/2015 | Suldhal | ............. | G06F 17/30286 |
| 2009/0073322 A1 * | 3/2009 | Shibahara | .......... | G06K 9/00711 348/726 |
| 2013/0006948 A1 * | 1/2013 | Shmueli | ............ | G06F 17/30153 707/693 |
| 2013/0117515 A1 * | 5/2013 | Ashmore | ................ | G06F 12/16 711/162 |
| 2013/0268738 A1 * | 10/2013 | Zhang | ................... | G06F 3/0619 711/162 |
| 2014/0122778 A1 * | 5/2014 | O'Brien | .................. | G06F 3/061 711/103 |
| 2014/0351550 A1 * | 11/2014 | Jun | ........................ | G06F 12/023 711/173 |
| 2015/0227544 A1 * | 8/2015 | Goldberg | .......... | G06F 17/30117 707/692 |
| 2015/0312124 A1 * | 10/2015 | Curtin | ................. | H04L 43/0876 709/224 |

* cited by examiner

*Primary Examiner* — Stephen Elmore
(74) *Attorney, Agent, or Firm* — Fenwick & West LLP

(57) ABSTRACT

Data objects are stored on storage devices, taking into account service level agreements or other quality of service parameters. In one aspect, data objects grouped into storage volumes. In addition, the storage devices are classified into different level storage tiers, where higher level storage tiers have higher performance and lower level storage tiers have lower performance. Ranks for the data objects are calculated, based on both a data usage pattern for the data object (e.g., recency and frequency) and on quality of service (QOS) parameters for the storage volume containing the data object. Examples of QOS parameters include service level agreements, priority, minimum and maximum input/output operations per second. The data objects are then stored on storage devices, based on the data objects' ranks and the storage devices' storage tiers.

14 Claims, 4 Drawing Sheets

DYNAMIC STORAGE TIERING BASED ON PERFORMANCE SLAS

BACKGROUND

1. Technical Field

The subject matter described herein generally relates to the field of input/output (I/O) request servicing systems, where the system stores data in different tiers of data storage.

2. Background Information

Consider an input/output (I/O) request servicing system where the system services multiple clients and dispatches I/O requests for the multiple clients. Each client has specified different performance parameters for its I/O requests. In order to provide a better experience for the clients, the system should dispatch I/O requests in a manner that meets the specified parameters of the clients and efficiently uses storage devices to meet the specified parameters. In multi-tiered storage systems, a higher tier (e.g., solid-state drive (SSD)) has a higher performance but higher cost, and a lower tier (e.g., hard disk) has a lower cost but lower performance. To better utilize tiers, conventional systems try to store more-frequently and more-recently accessed data at higher storage tiers and less-frequently and less-recently accessed data at lower storage tiers. This is done by moving data between tiers based on data usage patterns, including frequency and recency of accesses to the data.

SUMMARY

The above and other issues are addressed by technology for storing data objects on storage devices, taking into account service level agreements or other quality of service parameters.

In one aspect, data objects are grouped into storage volumes. In addition, storage devices are classified into different level storage tiers, where higher level storage tiers have higher performance and lower level storage tiers have lower performance. Ranks for the data objects are calculated, based on both a data usage pattern for the data object (e.g., recency and frequency) and on quality of service (QOS) parameters for the storage volume containing the data object. Examples of QOS parameters include service level agreements, priority, and minimum and maximum input/output operations per second. The data objects are then stored on storage devices, based on the data objects' ranks and the storage devices' storage tiers.

In an embodiment, the ranks for the data objects are calculated by calculating an object sub-rank and a volume sub-rank, and then combining the two. The object sub-rank is based on data usage pattern for the data object, and the volume sub-rank is based on quality of service (QOS) parameters for the storage volume containing the data object.

In another aspect, data objects can be promoted to storage in higher level storage tiers or demoted to storage in lower level storage tiers. This can be the result of a change in the data object's rank. It can also be the result of changes in other data objects being stored or their ranks. For example, a data object may be demoted to a lower level storage tier, in order to make space for new data objects that have higher ranks.

Other aspects include components, devices, systems, improvements, methods, processes, applications and other technologies related to the foregoing.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
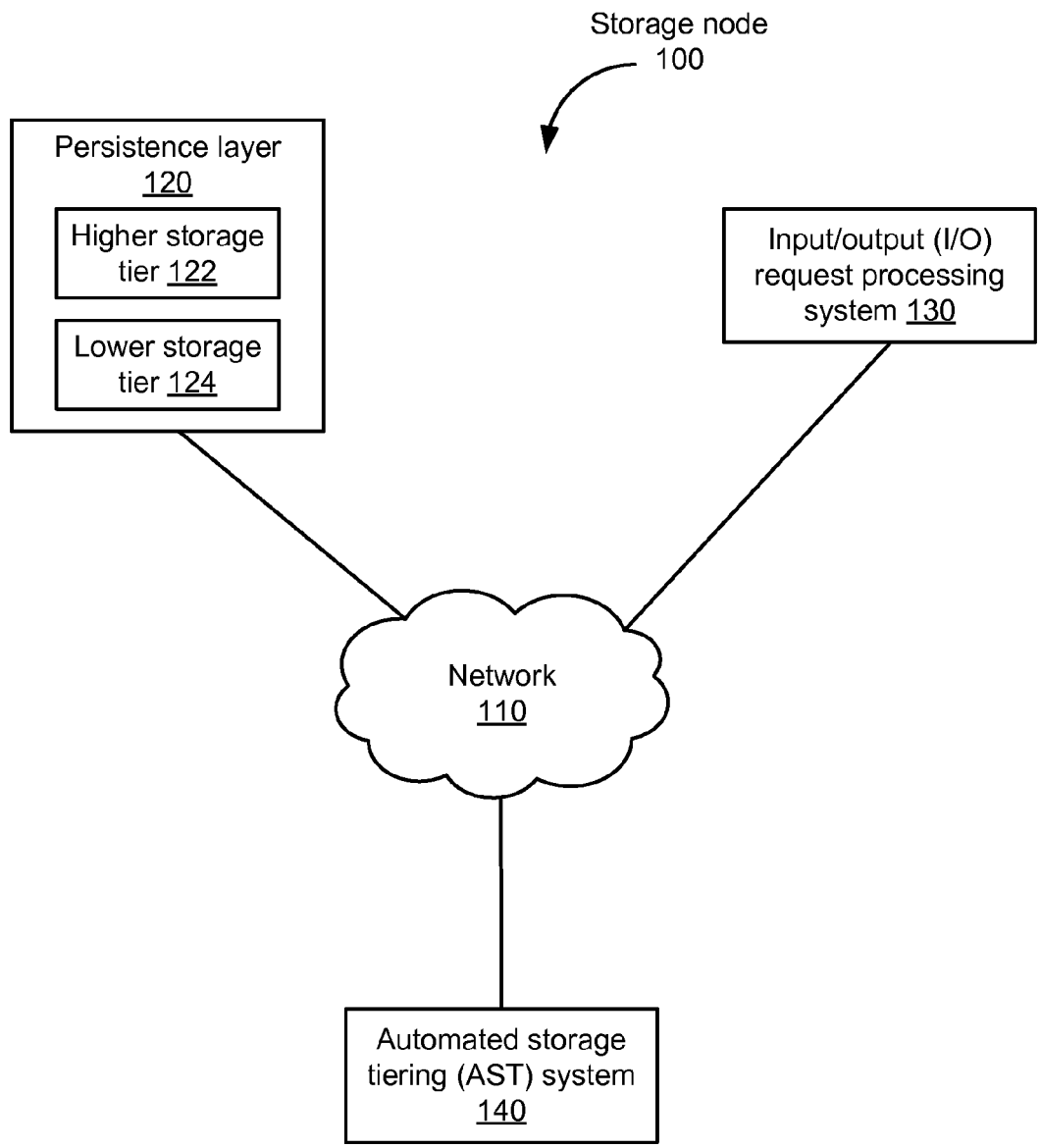
FIG. 1 is a high-level block diagram illustrating a storage node, according to one embodiment.

FIG. 1 is a high-level block diagram illustrating a storage node 100, according to one embodiment. The storage node 100 may be maintained by an enterprise (e.g., a corporation) that manages input/output (I/O) requests for clients. As shown, the storage node 100 includes a network 110, a persistence layer 120, an input/output (I/O) request processing system 130, and an automated storage tiering (AST) system 140.

The network 110 represents the communication pathway between the persistence layer 120, the I/O request processing system 130, and the AST system 140. In one embodiment, the network 110 uses standard communications technologies and/or protocols and can include the Internet. In another embodiment, the entities on the network 110 can use custom and/or dedicated data communications technologies.

The persistence layer 120 includes multiple data storage devices, and a single data storage device may be used to store data objects from different storage volumes. The data objects from a single storage volume may also be stored on different storage devices, including replicating data objects. For example, replications of the data objects of a storage volume can be distributed over different storage nodes. In one embodiment, the storage devices can be servers, non-volatile storage, flash memory devices, hard disk drives (HDDs), solid-state drives (SSDs), storage area networks (SANs), any other suitable storage devices, and any combination thereof. In this example, storage devices are classified in one of two groups of storage tiers: a higher storage tier 122 and a lower storage tier 124. The storage devices in the higher storage tier 122 are generally higher in cost and in performance than storage devices in the lower storage tier 124. In one embodiment, the storage devices in the higher storage tier 122 are SSDs, and the storage devices in the lower storage tier 124 are HDDs. This example uses two storage tiers 122, 124 as an example, but other embodiments can use three or more storage tiers.

In this example, a single storage volume is associated with a single I/O request queue, which stores one or more I/O requests. The I/O request queue is managed by the I/O request processing system 130. An I/O request specifies a particular storage volume in the persistence layer 120 and can be a write ("put") or a read ("get"). A single queue is associated with one or more clients who have purchased guaranteed rates for their I/O requests. In one embodiment, the guaranteed rates are measured by input/output operations per second (IOPS). Multiple clients can be associated with the same storage volume, and a single client can be associated with one or more storage volumes and I/O request queues. The I/O request processing system 130 receives I/O requests and processes them using the persistence layer 120 and the AST system 140.

The persistence layer 120 handles requests received from the I/O request processing system 130 for writing data objects to or reading data objects from storage devices of a particular storage tier in the persistence layer 120. During initial writing of a data object to a storage device, the particular tier of the storage device is stored in an entry in usage statistics 360. When reading data objects, a particular tier as indicated by usage statistics 360 is accessed.

The persistence layer 120 may also include an object cache that, for each write or read request associated with a data object received from the I/O request processing system 130, the I/O request processing system 130 also sends an instruction to the object cache to designate or make space for storing the data object. For read requests, a pointer is sent to a storage device storing the data object and reads the data object the pointer points at into the space of the object cache. For write requests, a pointer is also sent to a storage device of a destination tier for the data object and various caching policies can be used for workload optimization such as reads followed by write I/Os and read-ahead caching policies.

The persistence layer 120 also handles requests received from the AST system 140 for promoting or evicting/demoting a data object in the persistence layer 120. Promoting a data object moves the data object from a storage device in the lower storage tier 124 to a storage device in the higher storage tier 122, and evicting/demoting a data object moves the data object from a storage device in the higher storage tier 122 to a storage device in the lower storage tier 124. Movement (e.g., amortized movement) of data objects from a first storage tier to a second storage tier occurs in various sizes such as 1 GB, 768 MB, or any other suitable size.

Additionally, the persistence layer 120 reports total capacity and available capacity of the various storage tiers to the AST system 140. This information is used by a tiering placement module 330 of the AST system 140, as further described below in conjunction with FIG. 3.

The automated storage tiering (AST) system 140 is a computer (or set of computers) that instructs the persistence layer 120 to move data objects from a first storage tier to a second storage tier. The AST system 140 responds to requests from the I/O request processing system 130. For example, in response to a request from the I/O request processing system 130, the AST system 140 determines a destination tier for a put/write request for a data object. The AST system 140 is further described below with reference to FIGS. 3-4.

Figure 2:
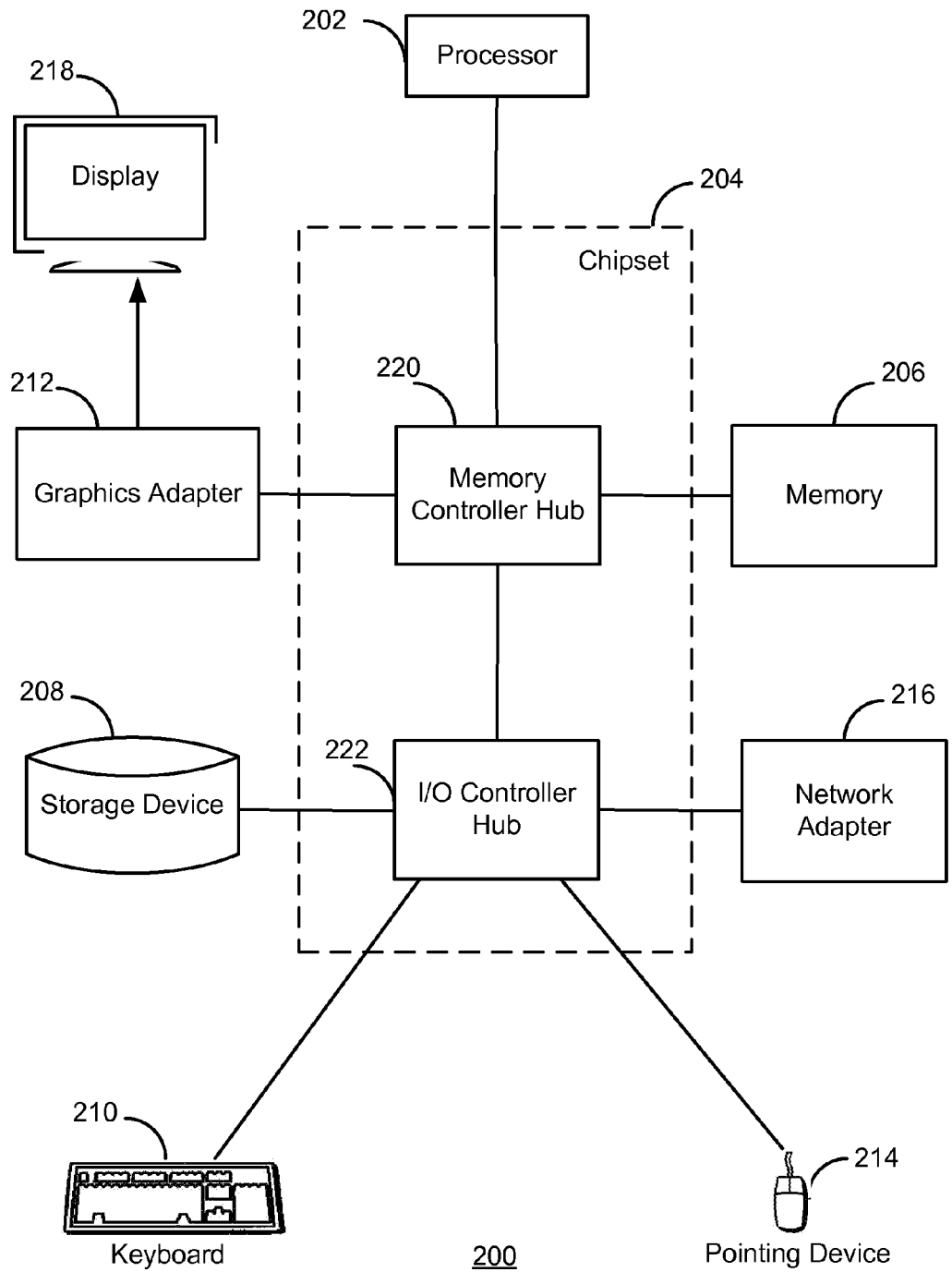
FIG. 2 is a high-level block diagram illustrating an example of a computer for use as one or more of the entities illustrated in FIG. 1, according to one embodiment.

FIG. 2 is a high-level block diagram illustrating an example of a computer 200 for use as one or more of the entities illustrated in FIG. 1, according to one embodiment. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the AST system 140 can be formed of multiple blade servers and lack a display device, keyboard, and other components.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
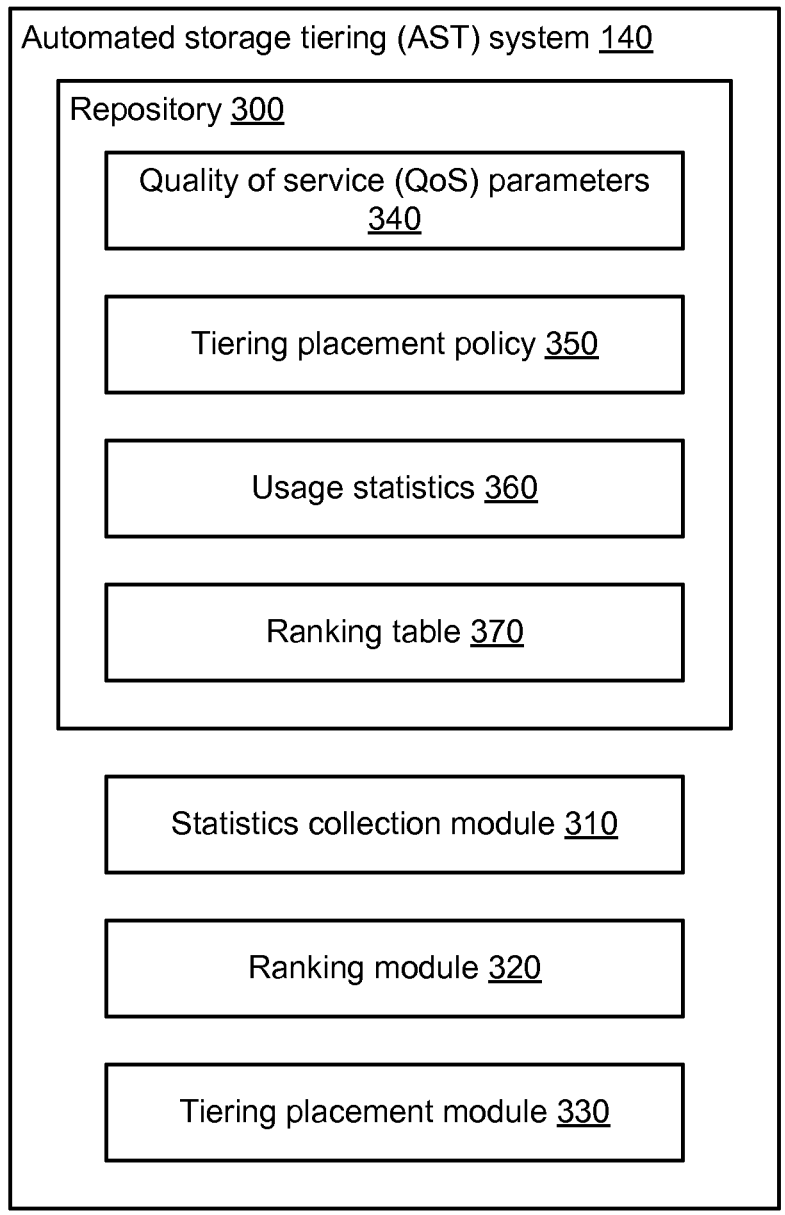
FIG. 3 is a high-level block diagram illustrating an automated storage tiering (AST) system, according to one embodiment.

FIG. 3 is a high-level block diagram illustrating an automated storage tiering (AST) system 140, according to one embodiment. The AST system 140 instructs the persistence layer 120 to move data objects from a first storage tier to a second storage tier and responds to requests from the I/O request processing system 130. The AST system 140 includes a repository 300, a statistics collection module 310, a ranking module 320, and a tiering placement module 330. The repository 300 is a computer (or set of computers) that stores quality of service (QoS) parameters 340, a tiering placement policy 350, usage statistics 360, and a ranking table 370.

The quality of service (QoS) parameters 340 include policies or service level agreements (SLAs) per storage volume for the storage volumes of the storage devices in the persistence layer 120. In one embodiment, volume policies stored in the QoS parameters 340 include priority, minimum input/output operations per second (IOPS), and maximum IOPS. A volume is required to achieve the volume policies of the volume as stored in the QoS parameters 340.

The tiering placement policy 350 is used to determine in which storage tier a data object should be placed when the data object is initially written to the persistence layer 120. Specifically, the storage volume associated with the data object is determined, and the storage tier for that data object is determined (in part based on the data object's storage volume). The tiering placement policy 350 can specify a higher storage tier, a lower storage tier or a "hybrid" storage tier, meaning that the data object can be stored in either a higher storage tier or a lower storage tier.

Determining where to place a data object specified for a hybrid storage tier can be based on QoS parameters 340 of other storage volumes of the storage tiers, the availability of space in the storage tiers, or any combination thereof, as considered during ranking and, more specifically, a volume sub-rank, of the data object, which is further described below in conjunction with FIGS. 3-4. For example, if a storage volume is associated with QoS parameters 340 of high min-IOPS or low latency requirements, then more of the data objects of this volume could be stored in the higher storage tier 122. During ranking of the data objects of this volume, the QoS parameters 340 of the volume will be used, and the "rank value" will tend to be lower (which indicates a higher "ranking") for the QoS values set for this volume along with object access frequency. Rank value and ranking are further described below in conjunction with the ranking module 320.

The usage statistics 360 include statistics regarding I/O activity such as data access and usage. A data object is associated with usage statistics 360 such as a total number of get/read operations for the data object over various intervals of time, average reads of the data object per minute, and one or more timestamps of the most recent read-access (es). The total number of get/read operations can be over an interval of time such as a periodic interval of time (e.g., every hour) or any other suitable interval of time (e.g., every 15 minutes). The average reads per minute can be over a past number of hours, minutes or any other suitable interval of time. A storage volume is associated with usage statistics 360 such as recent average throughput (IOPS) and latency of data objects belonging to the volume.

Usage statistics 360 also include location information of data objects. The location information of a data object can be a mapping from a data object identifier to a location, where the location includes an identifier of a storage tier of the data object, an identifier of a storage device in that tier, a filename in that storage device, and a file-offset specifying where in that file the data object is located.

The ranking table 370 stores rank values of data objects. The rank value of a data object is stored in association with an identifier of the data object. The ranking table 370 stores rank values for data objects that are stored in the persistence layer 120. A first portion of the ranking table 370, referred to as the "hot rank list", stores rank values for data objects that are stored in the higher storage tier. The number of entries in the hot rank list (i.e., how many data objects can be stored in the higher storage tier) is based on the number of volumes in storage devices in the higher storage tier 122 in the persistence layer 120. For example, the hot rank list can be data objects with rank values associated with at least a threshold position in the overall ranking table 370. The data objects in the hot rank list are data objects with at least a threshold frequency of accesses (e.g., get/read or put/write requests) which is reflected in the rank values of the data objects. Therefore, data objects in the hot rank list are stored in the higher storage tier 122.

The statistics collection module 310 updates usage statistics 360 as necessary. For example, for each or a threshold number of I/O requests regarding one or more data objects from the I/O request processing system 130, the statistics collection module 310 updates the usage statistics 360 for the data objects and respective volumes. Alternatively, the statistics collection module 310 updates the usage statistics 360 periodically or at specified intervals of time.

The ranking module 320 determines rank values of data objects. The ranking module 320 identifies the importance of storing a given data object in the higher storage tier 122 by assigning the object a rank value. In this example, a lower "rank value" specifies a higher "ranking" (i.e., a data object with a lower rank value will most likely be moved to a volume in a storage device in the higher storage tier 122). A rank value of a data object includes an object sub-rank and a volume sub-rank. The object sub-rank represents the data object's access/usage pattern. The volume sub-rank represents the access/usage pattern and/or service level agreements (SLAs) of the volume within which the data object is stored.

In one embodiment, the rank value is a 32-bit unsigned value, where the object sub-rank is the 16 most significant bits, and the volume sub-rank is the 16 least significant bits. Thus, the rank value is based on a tiering placement policy 350 of the data object, QoS parameters 340 of the data object, and usage statistics 360 of the data object and volume. The ranking module 320 also determines and stores a threshold rank value that can be determined by a number of volumes in the higher storage tier 122 available in the persistence layer 120. Then, data objects with rank values below the threshold rank value are stored in the higher storage tier 122. Calculating a rank value of a data object is further described below in conjunction with FIG. 4.

The ranking module 320 recomputes rank values of data objects and updates them in the ranking table 370. Recomputing and updating the rank values can take place periodically at an interval of time (e.g., every 10 minutes). If recomputation and updating is not finished in the interval of time, recomputation and updating can be continued in the next scheduled interval of time. Alternatively, the ranking module 320 can recompute and update upon a request from an eviction/demotion process or upon request from the tiering placement module 330 (e.g., when a data object is accessed with a read or write request). In yet another example, an administrator can also limit recomputation to certain time windows in a day or week to avoid QoS and performance effects on incoming I/O requests.

The tiering placement module 330 determines a destination tier for a data object when the data object is accessed either through a read or write request. When the data object is initially written in the persistence layer 120, the destination tier of the data object is determined based on the threshold rank value (determined by the ranking module 320 as previously described) and the data object's rank value.

If a destination tier of a data object is the higher storage tier 122 but not enough space is available in the higher storage tier 122, the tiering placement module 330 executes an eviction/demotion process to move data objects with higher rank values (i.e., lower overall rankings) to the lower storage tier 124. The tiering placement module 330 also executes a promotion process to move data objects with lower rank values (i.e., higher overall rankings) to the higher storage tier 122. For example, the promotion process is executed after the ranking module 320 updates the ranking table 370. Movement of the data objects between storage tiers (i.e., during the promotion and the eviction/demotion processes) occurs during scheduled intervals of time such as every hour or at other configurable intervals of time. The scheduled intervals of time can be specified manually (e.g., using a time-based job scheduler such as Cron in Unix-based operating systems) or scheduled by the tiering placement module 330. An administrator can limit movement of data objects to certain time windows in a day or week to avoid QoS and performance effects on incoming I/O requests as well as limit how many data objects are moved during movement (i.e., during the promotion and eviction/demotion processes) by specifying a size limit such as 10 GBs or 20 GBs.

Figure 4:
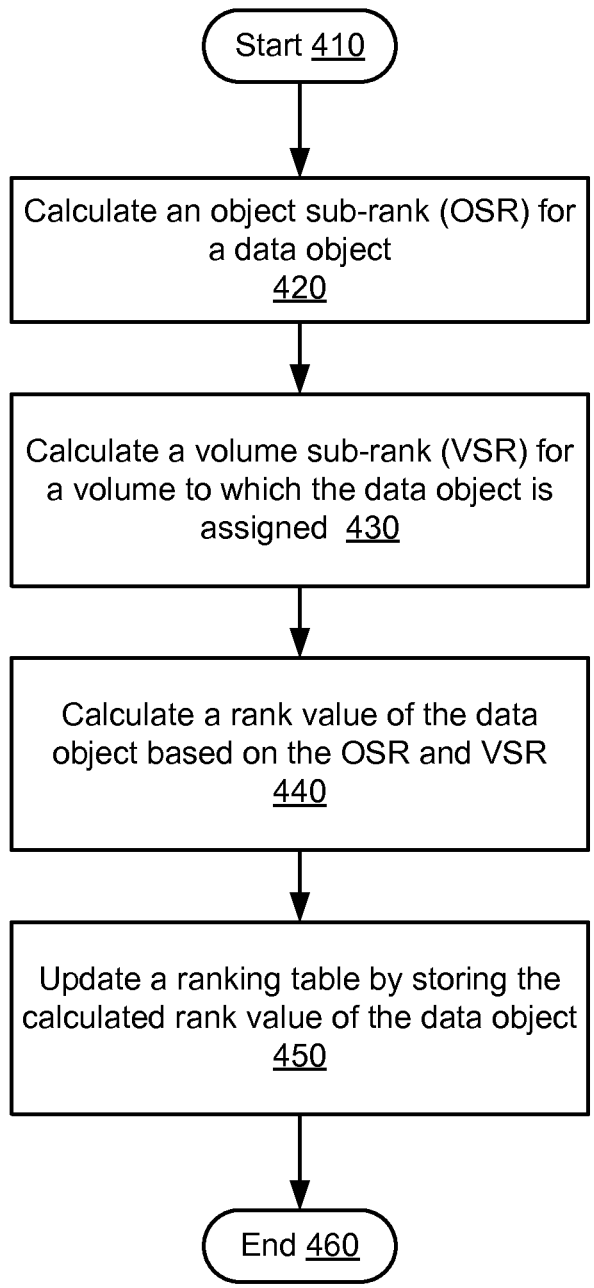
FIG. 4 is a flowchart illustrating a method of calculating a rank value of a data object, according to one embodiment.

FIG. 4 is a flowchart illustrating a method 400 of determining a rank value of a data object, according to one embodiment. In one embodiment, the method 400 is performed by the ranking module 320 periodically, when a new I/O request is received from the I/O request processing system 130, or an occurrence of another event. Other embodiments can perform the steps in different orders and can include different and/or additional steps. In addition, some or all of the steps can be performed by entities other than those shown in FIG. 3.

When the method 400 starts 410, the ranking module 320 calculates an object sub-rank for a data object associated with an I/O request, as in step 420. In some embodiments, the object sub-rank of a data object is calculated using traditional techniques based on frequency of accesses to the data object and recency of those accesses.

In an alternative embodiment, the object sub-rank of a data object is calculated using a circular counter array. The circular counter array incorporates recency information into a frequency metric. In one example, the circular counter array includes one or more arrays storing frequency information (e.g., a number of accesses to the data object) associated with various intervals of time (e.g., a timestamp of a most recent access in the array), and each of the one or more arrays is weighted based on recency of those intervals of time. Thus, an array with older frequency information is given a lower weight, and an array with more recent frequency information is given a higher weight. Then, the object sub-rank (OSR) of a data object is calculated as a binary NOT of the weight sum of the arrays, as shown below in equation (1)

$$OSR = \sim \Sigma_{i=0}^{N-1} \text{array}[i] * 0.9^i \qquad (1)$$

for N total arrays.

In some embodiments, a number of least significant bits of the object sub-rank can be reset and thereby the frequency information is rounded. Thus, if a first data object was accessed 35 times and a second data object was accessed 36 times, since the number of accesses (i.e., 35 and 36) are very similar or within a threshold difference with each other, a number of least significant bits representing the difference in the number of accesses in the object sub-rank can be reset so the rank values of the first data object and the second data object are differentiated based on the respective volume sub-ranks instead (e.g., based on the SLAs of the respective volumes to which the first and second data objects are assigned).

As an example, each array in the circular counter array of a data object counts a number of accesses to the data object in a different 10-second interval of time. A first array in the circular counter array counts a number of accesses in a first 10-second interval (e.g., 0-10 seconds), a second array in the circular counter array counts a number of accesses in a second 10-second interval (e.g., 10-20 seconds), and so on. Then, a weight of the first array is based on a timestamp associated with a most recent access counted in the first array, a weight of the second array is based on a timestamp associated with a most recent access counted in the second array, and so on. Therefore, if the circular counter array includes X arrays, the circular counter array of the data object keeps count of accesses to the data object in X*10 seconds. After X*10 seconds have passed and all X arrays store a number of accesses to the data object, the first array is reset and stores a number of accesses during the next 10-second interval of time. Following the previous example, when the first array is reset, it will store a number of accesses for the data object during X*10 seconds to X*10+10 seconds.

In one embodiment, only usage statistics 360 for recently accessed data objects, such as data objects listed in the hot rank list, are stored in the usage statistics 360. Therefore, if a data object has not been accessed recently or for a long interval of time, the statistics such as the frequency information can be deleted for the data object or will not be stored based on the circular counter array, which overwrites older access information with more recent access information.

Thus, the OSR for a data object that has not been accessed recently would be OSR=~0, resulting in a higher rank value and lower ranking.

In step 430, the ranking module 320 calculates a volume sub-rank for a volume to which the data object is assigned. A volume sub-rank of a volume is calculated based on volume policies as specified in the QoS parameters 340 and volume usage statistics as specified in the usage statistics 360. In one embodiment, QoS parameters 340 of the volume include volume priority, min IOPS, and max IOPs and the usage statistics 360 of the volume include average throughput ("recentIOPS").

The volume sub-rank is first assigned to a "bucket." Each bucket is associated with various conditions associated with QoS parameters 340 and/or usage statistics 360. For example, in one embodiment, there are four buckets (e.g., buckets 0-3) as follows:

Bucket 3 includes volumes that meet the following conditions:

$$\text{maxIOPS}[\text{volume}] < \text{threshold1 \&\& maxIOPS}[\text{volume}] != 0 \qquad (2)$$

where threshold1 is configurable and can be between 4,000 and 10,000 IOPS, for example.

Bucket 2 includes volumes that meet the following conditions:

$$\text{minIOPS}[\text{volume}] == 0 \qquad (3);$$

Bucket 1 includes volumes that meet the following conditions:

$$\text{recentIOPS}[\text{volume}] >= \text{minIOPS}[\text{volume}] \ \& \ (\text{queueSize}[\text{volume}] > q_{threshold}) \qquad (4),$$

where $q_{threshold}$ is a configurable percentage of the total queue size (e.g., 4,096 I/O requests) such as 90% to 95% and queueSize[volume] is an average queue size of the volume and can be periodically calculated or updated.

Bucket 0 includes volumes that meet the following conditions:

$$\text{recentIOPS}[\text{volume}] < \text{minIOPS}[\text{volume}] \ \& \ (\text{queueSize}[\text{volume}] > q_{threshold} \text{ or queueFullEvents} > q_{fullEventsThreshold}) \qquad (5),$$

where $q_{threshold}$ is a configurable percentage of the total queue size (e.g., 4,096 I/O requests) such as 90% to 95%, $q_{fullEventsThreshold}$ is configurable (e.g., 5 to 10 events in a period of 1 minute), and queueFullEvents is a number of queueFull events that occurred in a time interval (e.g., 15 minutes). Thus, if a full queue size or queueFull is 5 events then queueFullEvents is 5. Based on the bucket to which the volume is assigned, the volume sub-rank (VSR) of a volume to which a data object is assigned is calculated as shown below in equation (6):

$$\text{VSR(volume)} = (\text{bucketNum} * \text{TotalBuckets}) + \text{priority(volume)} \qquad (6),$$

where bucketNum is the bucket to which the volume is assigned (0-3 in this example), TotalBuckets is a total number of buckets to which a volume can be assigned (4 in this example), and priority(volume) is a relative priority set for a volume and can be 1 (highest priority) to 10 (lowest priority) in this example.

In step 440, the ranking module 320 calculates a rank value of the data object based on the object sub-rank of the data object and the volume sub-rank for the volume to which the data object is assigned, as were calculated in steps 420 and 430, respectively. In one embodiment, the rank value (RV) of a data object is calculated as shown below in equation (7):

$$RV = ((OSR << 16) \& 0\mathit{XFFFF}0000) + VSR \quad (7),$$

where OSR, VSR, and RV are expressed in hexadecimal format.

In step 450, the ranking module 320 updates the ranking table 370 by storing the newly calculated rank value of a data object in the ranking table 370. For example, if the rank value of the data object is less than a threshold rank value, then the data object is added to the hot rank list.

In step 460, the method ends. Later, the tiering placement module 330 can execute a promotion process or an eviction/demotion process based on the hot rank list. For example, if a threshold number of data objects on the hot rank list have changed from a previous hot rank list, then the tiering placement module 330 can execute one or more of the processes.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of storing data objects on storage devices, the data objects grouped into storage volumes, the storage devices classified into different level storage tiers, wherein higher level storage tiers have higher performance and lower level storage tiers have lower performance, the method comprising:
    calculating ranks for the data objects, a rank for a data object based on a data usage pattern for the data object and on quality of service (QOS) parameters for the storage volume containing the data object; and
    storing the data objects on the storage devices, based on the data objects' ranks and the storage devices' storage tiers.

2. The method of claim 1, wherein the QOS parameters for the storage volumes comprise service level agreements for the storage volumes.

3. The method of claim 1, wherein the QOS parameters for the storage volumes comprise priority for the storage volumes.

4. The method of claim 1, wherein the QOS parameters for the storage volumes comprise minimum input/output operations per second for the storage volumes.

5. The method of claim 1, wherein the QOS parameters for the storage volumes comprise maximum input/output operations per second for the storage volumes.

6. The method of claim 1, wherein the data usage patterns for the data objects comprise recency of access for the data objects.

7. The method of claim 1, wherein the data usage patterns for the data objects comprise frequency of access for the data objects.

8. The method of claim 1, wherein calculating ranks for the data objects comprises:
    calculating an object sub-rank, the object sub-rank for the data object based on data usage pattern for the data object;
    calculating a volume sub-rank, the volume sub-rank for the data object based on quality of service (QOS) parameters for the storage volume containing the data object; and
    calculating the rank by combining the object sub-rank and volume sub-rank.

9. The method of claim 8, wherein the object sub-rank is more significant than the volume sub-rank.

10. The method of claim 8, wherein the object sub-rank is calculated using a circular counter array.

11. The method of claim 1, wherein:
    calculating ranks for the data objects comprises updating the ranks for the data objects based on usage of the data objects; and
    storing the data objects on the storage devices comprises storing the data objects on higher level storage tiers based on their updated ranks.

12. The method of claim 1, wherein:
    storing the data objects on the storage devices comprises storing new data objects on higher level storage tiers and demoting previously stored data objects to lower level storage tiers, based on the ranks of the data objects.

13. A non-transitory computer-readable storage medium storing computer program modules for storing data objects on storage devices, the data objects grouped into storage volumes, the storage devices classified into different level storage tiers, wherein higher level storage tiers have higher performance and lower level storage tiers have lower performance, the computer program modules executable to perform steps comprising:
    calculating ranks for the data objects, a rank for a data object based on a data usage pattern for the data object and on quality of service (QOS) parameters for the storage volume containing the data object; and
    storing the data objects on the storage devices, based on the data objects' ranks and the storage devices' storage tiers.

14. A system for storing data objects on storage devices, the data objects grouped into storage volumes, the system comprising:
    a persistence layer comprising multiple storage devices, the storage devices classified into different level storage tiers, wherein higher level storage tiers have higher performance and lower level storage tiers have lower performance;
    a non-transitory computer-readable storage medium storing computer program modules executable to perform steps comprising:
        calculating ranks for the data objects, a rank for a data object based on a data usage pattern for the data object and on quality of service (QOS) parameters for the storage volume containing the data object; and
        storing the data objects on the storage devices, based on the data objects' ranks and the storage devices' storage tiers; and
    a computer processor for executing the computer program modules.

* * * * *